United States Patent

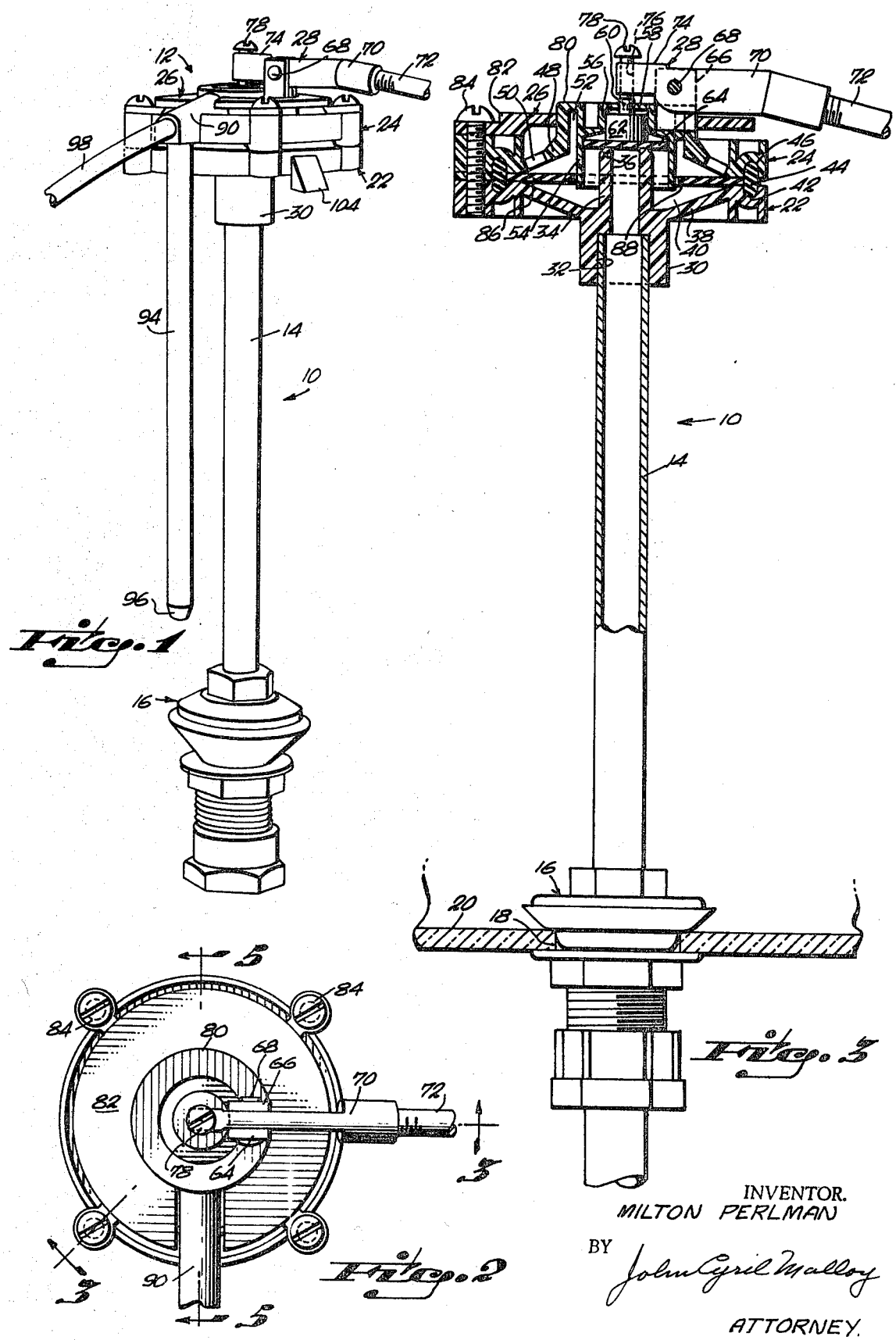

[11] 3,559,673

| [72] | Inventor | Milton Perlman |
| | | 1745 W. 33rd Place, Hialeah, Fla. 33012 |
| [21] | Appl. No. | 828,491 |
| [22] | Filed | May 28, 1969 |
| [45] | Patented | Feb. 2, 1971 |

[54] ANTI-SYPHON BALLCOCK VALVE ASSEMBLY
8 Claims, 6 Drawing Figs.

[52] U.S. Cl. .................................................. 137/218, 137/347
[51] Int. Cl. .................................................. E03c 1/00, F16k 45/00
[50] Field of Search ........................................... 137/217, 218, 347

[56] References Cited
UNITED STATES PATENTS

| 2,282,338 | 5/1942 | Moody | 137/218 |
| 2,306,508 | 12/1942 | Svirsky | 137/218 |
| 2,779,350 | 1/1957 | Owens | 137/218 |
| 2,791,235 | 5/1957 | Smith | 137/437 |
| 2,989,071 | 6/1961 | Fulton et al. | 137/437 |

Primary Examiner—Robert G. Nilson
Attorney—John Cyril Malloy

ABSTRACT: A plastic antisyphon, ballcock valve assembly in which an axial water pressure inlet includes an upper valve seat engageable by a shutoff washer operated by a plunger and floatball operated lever which includes an adjusting screw to control the water level in a flush tank or the like, and in which a peripherally sealed diaphragm includes a free inner edge surrounding the valve seat and is urged into sealing relationship with respect to air-introducing apertures when the sealing washer is unseated and water is directed in a circuitous path to an outlet conduit including branch ducts respectively connected to a hush pipe and flush tank stand pipe, and in which an adjustable screw is interposed at the branch ducts to divide the water flow through the hush pipe and stand pipe conduits to balance and substantially diminish sounds emitted as water is discharged therefrom; and in which substantially all of the working components of the antisyphon ballcock valve assembly are immediately adjacent to the upper portion of a flush tank providing ready access for maintenance, replacement and repair and in which an extremely high "critical level" is provided whereby danger of syphoning is obviated and substantially eliminated, and the flush tank can be maintained at a minimum height.

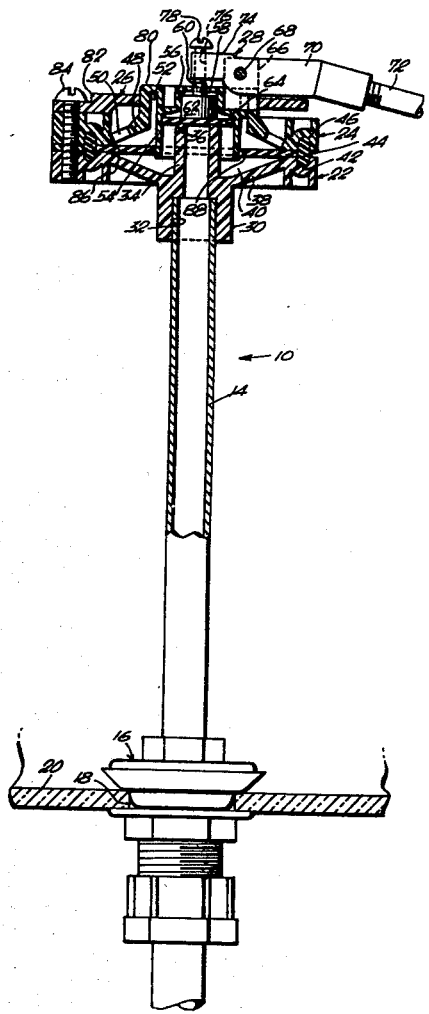

INVENTOR.
MILTON PERLMAN
BY John Cyril Malloy
ATTORNEY.

3,559,673

ANTI-SYPHON BALLCOCK VALVE ASSEMBLY

This invention relates generally to control valves, and more particularly to an improved antisyphon ballcock valve assembly particularly adapted for use in flush tanks of water closets, for example.

Many attempts have been made to provide improved ballcock valves, one of which being disclosed in U.S. Letters Patent to Fulton et al No. 2,989,071, for example. Some of the requisites of a practical and satisfactory ballcock valve conforming with the statutory requirements, are that it has means for preventing syphoning of water out of a flush tank to prevent contamination of a fresh water system, additionally, the ballcock valve should be relatively maintenance free, readily accessible in the event it must be repaired, should be silent in operation, constructed of economically produced parts, and should be corrosion resistant and comply with local, State and Federal codes.

Primary objects of the present invention are:

To provide an improved ballcock valve in which the operating components are disposed in a relatively flat assembly immediately adjacent to the upper end of a water inlet pipe to facilitate maintenance and repair of the ballcock valve;

To provide a substantially all-plastic ballcock valve in which antisyphon means are provided and a "critical high water level" is provided i.e substantially immediately adjacent to the uppermost portion of the valve assembly;

To provide a novel ballcock valve in which the primary outlet or hush tube of the valve includes a lower tapered distal end portion for promoting quiet operation when discharging water into a flush tank.

To provide in a ballcock valve of the character mentioned above, means for dividing or controlling fluid flow between a hush tube and stand pipe outlet tube to balance the fluid flow to each and accordingly promote relatively quiet operation.

These together with other and more specific objects and advantages of the invention will become apparent from the following description of an exemplary embodiment when taken in conjunction with a drawing forming a part thereof in which:

IN THE DRAWING

FIG. 1 is a perspective view of the ballcock valve assembly of the invention;

FIG. 2 is a top plan view of FIG. 1;

FIG. 3 is an enlarged vertical section taken substantially on the plane of line 3–3 of FIG. 2 showing the ballcock valve mounted on an inlet pipe connected to the lower wall of a flush tank of a water closet, and showing the general attitude of the parts when the flush tank is filled;

Figure 4:
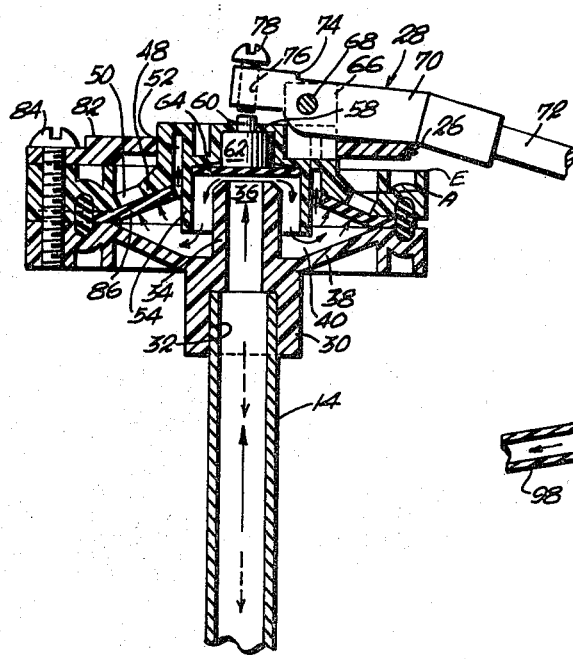
FIG. 4 is a fragmentary section, similar to the upper portion of FIG. 3, showing the position of the parts when the flush tank is empty and water is being introduced therein.

Referring to the drawing in detail, first considering FIGS. 1 to 3, the ballcock valve assembly is indicated generally at 10 and comprises the ballcock valve 12 mounted on the upper end of a conventional water inlet pipe 14; the latter including, on its lower end a clamp nut-and-sealing assembly indicated generally at 16 for mounting the ballcock valve assembly in a suitably apertured portion 18 of the flush tank bottom wall 20 of a water closet or the like. The assembly 16 is generally conventional and detailed description thereof will not be included.

The ballcock valve 12 includes a valve seat member 22, a valve body member 24, a splash guard or valve cover 26 and an operating and piston-lever assembly 28.

A valve seat member 22 comprises a lower annular mounting hub 30 having an undercut bore portion 32 sealingly connected to the upper end of the water inlet pipe 14. The inlet of the valve seat member comprises a vertically extending tubular element 34 having a tapered valve seat 36 at its upper end. Surrounding the tubular element 34 as an integral part of the valve seat member is a substantially conical floor or wall 38 defining the lower portion of an annular chamber 40 substantially surrounding the tubular element 34. Formed in the outer periphery of the valve seat member is an upwardly opening groove 42 accommodating therein an annular, O-ring type seal 44. The valve body member 24 is substantially complimentary to the valve seat member including a downwardly opening, outer peripheral groove 46 engaging the upper portion of seal ring 44, and projecting upwardly and inwardly is an annular, substantially conical roof portion 48 including a plurality of circumferentially spaced apertures 50 therethrough; see FIG. 6. The inner edge of the roof 48 terminates at an axially extending, annular chamber 52 formed by a depending sleeve 54 circumposed about and in space relation from the tubular element 34 of the valve seat member 22. The valve body member 24 includes in opposed overlying relationship with respect to the valve seat 36 an annular recess 56 closed at the top by an apertured wall 58 in which is guidably retained an upper stem portion 60 of an operating piston 62. Interposed between the piston 62 and valve seat 36 is a circular, resilient washer or disc 64 which will function to be forcibly urged onto the seat 36 and prevent starter from moving thereby when the flush tank is filled to a predetermined level.

The predetermined level of the flush tank is controlled by the assembly 28 which includes the stem portion and piston 60, 62. The assembly 28 is pivotally mounted on transversely apertured pivot ear elements 64, 66 by means of a transverse pivot pin 68 extending through a correspondingly apertured handle portion 70 in which a float rod 72 is threadably secured. The rod 72 includes on its outer end (not shown) a conventional float which will float on the surface of the water in the flush tank and cause the rod 72 to pivot in a counterclockwise direction as illustrated by the dotted arrow in FIG. 4. Inwardly of the pivot pin 68 is a control lever portion 74 having a downwardly opening threaded bore 76; see FIG. 5 in which an abutment screw 78 is adjustably retained. The adjustment screw 78 abuttingly engages the upper end of stem portion 60 of the control piston 62 and accordingly controls the extent of counterclockwise movement to be effected by the rod 72 in order to press the control piston 62 downwardly and cause seal 64 to engage the valve seat 36; see FIG. 3.

Figure 6:
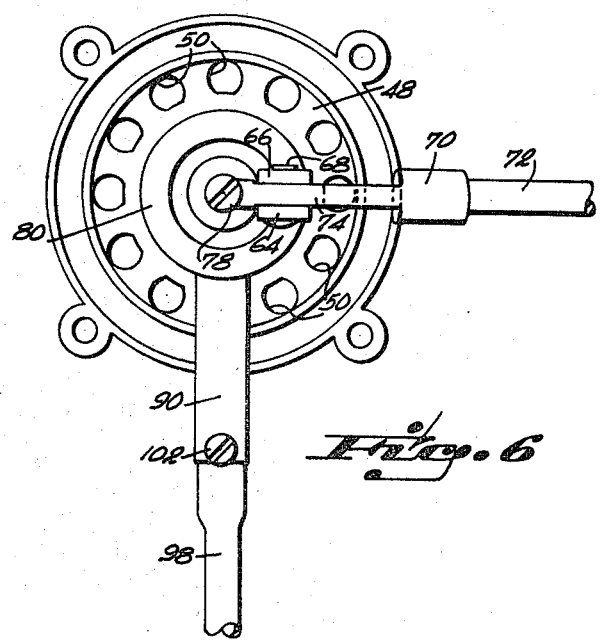
FIG. 6 is a top plan view of the ballcock valve in the attitude generally shown in FIG. 2, with the splash guard of the ballcock valve removed.

It will be observed that the valve body member incorporates an upper, substantially annular, axially projecting portion 80; see FIG. 6, for example, and surrounding this hub and overlying the apertures 50 is a disclike splash plate 82. The valve seat member, valve body member and splash plate include aligned and suitably threaded protrusions circumferentially spaced about and receiving therethrough assembly screws 84; preferably of the tapered type which cause a wedge action during assembly.

Disposed within chamber 40 is an annular, flexible sealing diaphragm 86 clamped at its outer periphery between overlying portions of the valve seat and valve body members immediately adjacent to the O-ring 44. The inner edge 88 of the diaphragm 86 is spaced from the sleeve 54 of the valve body member, and is free to move upwardly into sealing engagement beneath the holes 50 in the roof 48 of the valve body member.

Figure 5:
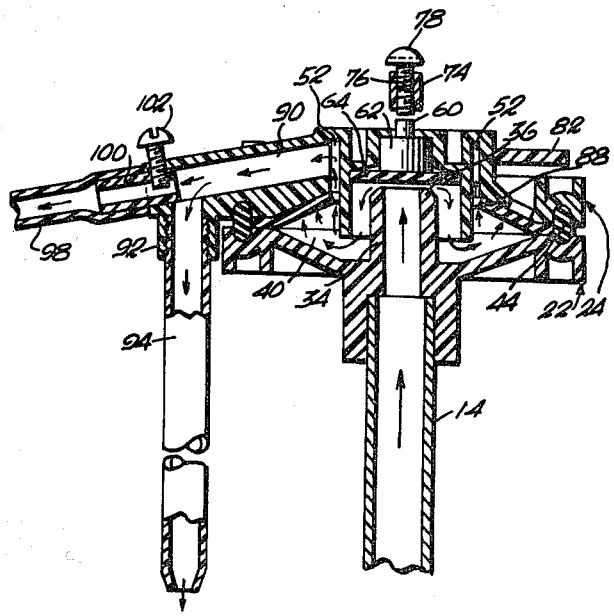
FIG. 5 is a fragmentary, vertical section substantially on the plane of line 5–5 of FIG. 2, showing the relative position of the parts as in FIG. 4 when water is being introduced into the flush tank.

Communicating radially with the annular chamber 52 formed by the valve body member; see FIG. 5, is a duct 90 communicating with a depending branch conduit 92 in which the upper end of a depending hush pipe 94 is sealingly secured. The lower end of the hush pipe 94 is tapered and will have a silencing effect on water discharged therefrom. Also in communication with duct 90 is a flexible conduit 98 telescopically received on a reduced, diameter portion 100, and substantially at the intersection between the hush pipe entrance 94 and the conduit 98 an adjusting screw 102 is disposed The adjusting screw 102 will function to distribute fluid flow through the conduit 98 and hush pipe 94. The conduit 98 will be connected in the usual manner to a stand pipe conventionally found in the flush tank of a water closet.

The valve seat member 22; see FIG. 1, has depending from one side thereof a reference lug element 104 used as a gauge from which to measure to the uppermost edge of a flush tank stand pipe; this particular distance or height generally being prescribed by the local plumbing code Before describing the operation, the flexible diaphragm 86, it will be observed, can be produced integral with the O-ring seal 44; on the other hand, it may prove that the O-ring seal 44 is unnecessary Additionally, the ball check valve 12, exclusive of the assembly screws 84, for example is produced essentially from plastic materials These plastic materials have an inherent ability to resist corrosion when immersed in the water of a flush tank over extended periods of time

OPERATION

As previously mentioned, the antisyphon ballcock valve 10 is mounted on the lower wall 20 of a flush tank as is conventional. Although not shown, the conduit 98 will engage in the conventional stand pipe.

Referring to FIG. 3, the parts are illustrated in the attitude where the flush tank is filled to a predetermined level, and the plunger 62 engages the sealing disc or washer 64 and forcibly urges it in sealing relation of the valve seat 36. During this condition, the sealing diaphragm 86 is in a generally horizontal position; as shown due to its inherent resiliency. Referring to FIG. 4 after the flush tank has been flushed, and the water rapidly discharges therefrom (in the conventional manner), the tank is permitted to refill because of the abutment screw 78 is spaced from and above the stem 60 of the plunger 62. As indicated by the solid arrows in FIG 4, as well as in FIG. 5, water leaves the stand pipe 14 moves past the valve seat 36, urging the sealing washer 64 off the seat. and then passes downwardly within the sleeve 54 and below the lower edge thereof and engages the undersurface of the diaphragm 86. The diaphragm is urged upwardly into sealing engagement beneath the apertures 50 of the valve body member. and the inner edge 88 permits water to flow into annular chamber 52. Water entering this chamber then moves out of the duct 90, a portion going through conduit 98 and the major portion going through the hush pipe 94.

The conduit 98 will generally be flexible and be bent and clipped to the conventional stand pipe of a flush tank. On the other hand, the hush pipe 94 will depend from about 1 to 2 inches above the upper surface of the bottom wall of a flush tank, and it has been found through the use of a terminally tapered outlet 96, as seen in FIG. 5. the hush pipe has an unusually quiet operation. The plumber installing the ballcock valve assembly will so adjust the screw 102 to provide an optimum distribution of the fluid going to the hush pipe 94 and conduit 98 and attain maximum available silent operation.

After the flush tank is filled to a predetermined level, the parts once more return to the positions shown in FIG. 3, and fluid flow in the direction of the solid arrows of FIGS. 4 and 5 is caused to stop Some water can possibly leak around the edge 88 of diaphragm 86 and pass upwardly through the holes of 50 in the valve body member, however, this is not critical inasmuch as the valve cover 82 prevents water from leaving these apertures under any appreciable pressure and further, any water passing through these apertures will pass beneath the valve cover 82 and descend into the flush tank being filled Since the hush tube 94 is substantially below the surface of the water in a flush tank after it has been filled, in the event a vacuum should inadvertently exist in the stand pipe 14; due to an appreciable drop in pressure, for example, it is important that the water in the flush tank is not syphoned or sucked out of the flush tank into the pure water system. This function is prevented inasmuch as when a vacuum or negative pressure exists in the stand pipe 14 according to the dotted direction arrows in FIG. 4, the diaphragm 86 is pulled downwardly a sufficient degree to permit air to be drawn through the apertures 50 and accordingly interposing an air bubble to prevent syphoning of water out of the flush tank.

In the event the water level is above the uppermost edge of the valve body, and a vacuum should exist in pipe 14 over an extended period of time, water be drawn to a level even with the upper surface of the valve body 24 whereafter, air would be drawn through the apertures 50 to break up syphon action. Thus, the critical level of the ballcock valve i.e. level at which syphoning might inadvertently occur, is between the uppermost edge E and the uppermost portion of the apertures A; see FIG. 4. In this width of the ballcock valve 12 where syphoning might occur, and the flexible diaphragm 86 moves sufficiently from beneath the part apertures 50 to permit air to enter the ballcock valve and destroy any vacuum necessary to produce syphoning.

Briefly, the improved antisyphon ballcock valve includes the silencing feature of the hush tube in addition to the adjustable screw for balancing the fluid flow between the hush tube and the refill tube. Further, the flexible diaphragm provides an antisyphon action and a critical level on the ballcock valve which permits the ballcock valve to be produced as a relatively flat package in which all of the working parts are at the extreme upper end of a vertical stand pipe. Having the working parts disposed at the extreme upper end of a stand pipe, permits one to have ready access to these parts for the purposes of maintenance and repair.

I claim:

1. An antisyphon ballcock valve assembly for use in a flush tank or the like from maintaining a predetermined level of water in the tank, comprising;

a valve seat member including a lower axial inlet for connection to a water-inlet pipe, said axial inlet including a tubular element having an upper valve seat surrounded by a chamber;

a valve body member on said valve seat member, said valve body member including an apertured roof defining the upper portion of said annular chamber and communicating exteriorally of said valve body;

a resilient diaphragm element peripherally clamped between said valve seat and valve body members, said diaphragm element having a free inner edge circumposed in space relation about said axial inlet tubular element and sealingly engageable beneath said apertured roof when subject to water pressure therebeneath, said valve body member including a conduit communicating with said chamber and including branch conduits for connection to a depending hush tube and stand pipe inlet tube, means on said conduit for dividing fluid flow into the respective tubes;

sealing washer means in said chamber overlying said valve seat; and lever-and-plunger means mounted on said valve body member for actuating said sealing washer in response to a fluid level being controlled for engaging or permitting disengagement of the sealing washer with respect to said valve seat.

2. The structure as claimed in claim 1 in which said annular chamber comprises substantially conical portions of said valve seat and valve body members, said conical portions converging axially away from said flexible diaphragm element.

3. The structure as claimed in claim 1 in which said valve body member includes a sleeve in projecting axially about and below said valve seat, said sealing washer being disposed in said sleeve.

4. The structure as claimed in claim 3 in which said lever-and-plunger means comprises a plunger reciprocably restrained in said valve body member for axial movement above said sealing washer and including stem portion projecting axially above said valve body member, a lever element intermediately pivoted on said valve body member and including a lever portion overlying said plunger stem, an adjustable abutment screw extending through said lever portion and engageable with said plunger stem for adjusting the level of fluid in a flush tank being controlled.

5. The structure as claimed in claim 1 in which said conduit projects radially along the upper surface of said valve body member, a tubular sleeve depending from said conduit, an elongated hush pipe sealingly engaged at its upper end in said sleeve, said hush pipe including a lower terminally tapered end for reducing noise of water being discharged through said hush tube.

6. The structure as claimed in claim 5 in which said stand pipe inlet tube extends axially from said conduit in substantially intersecting relationship with respect to said hush pipe, a screw adjustably retained in said conduit and extendable transversely with respect to said inlet tube for balancing the flow of liquid into said inlet tube and hush pipe.

7. The structure as claimed in claim 1 in which a valve cover overlies the upper surface of said valve body member and is retained in space relation thereabove whereby water discharged through the apertures in said valve body member will engage the undersurface of said valve cover before being discharged into a flush tank.

8. The structure as claimed in claim 1 in which said valve seat member, valve body member, sealing washer and flexible diaphragm are produced from plastic materials.